Jan. 2, 1968  R. J. PURTELL  3,361,360

IRRIGATION SYSTEM

Filed Dec. 7, 1965  3 Sheets-Sheet 1

INVENTOR
RUFUS J. PURTELL
by C. W. Hoffee
Atty.

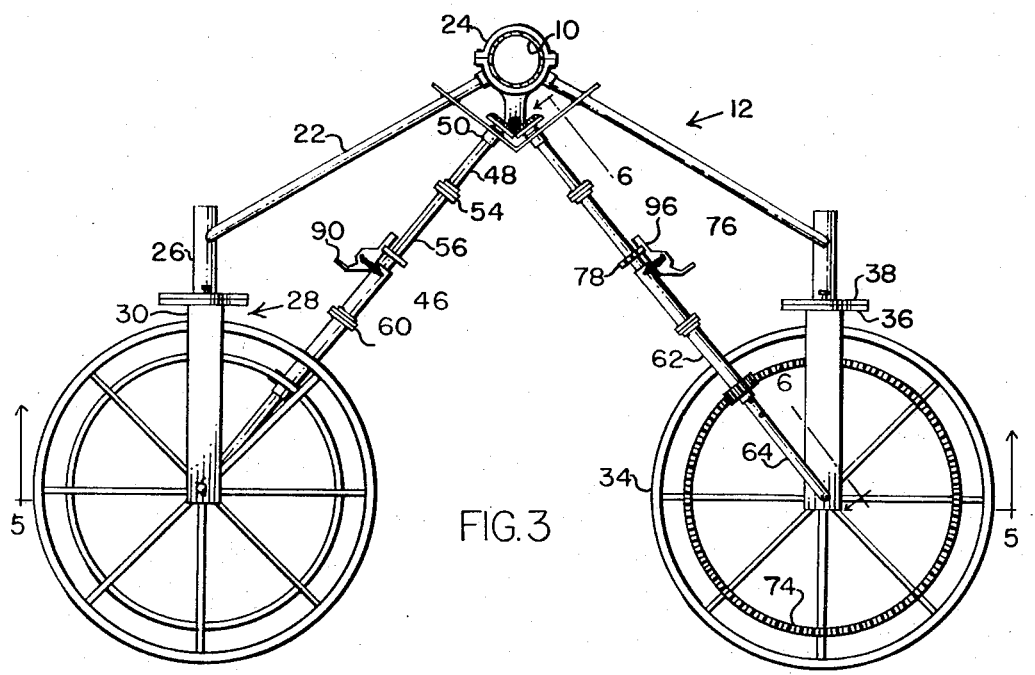
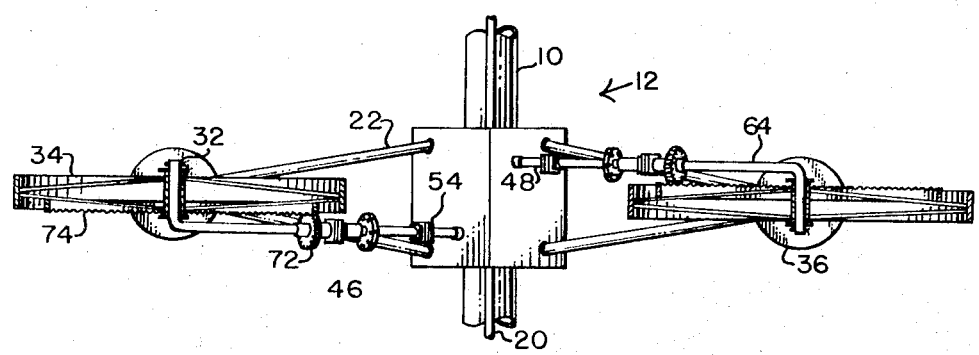
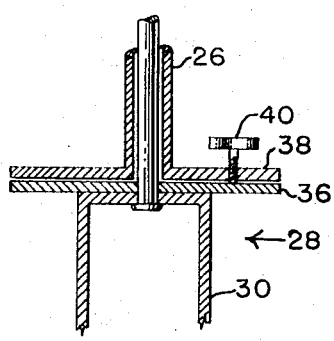

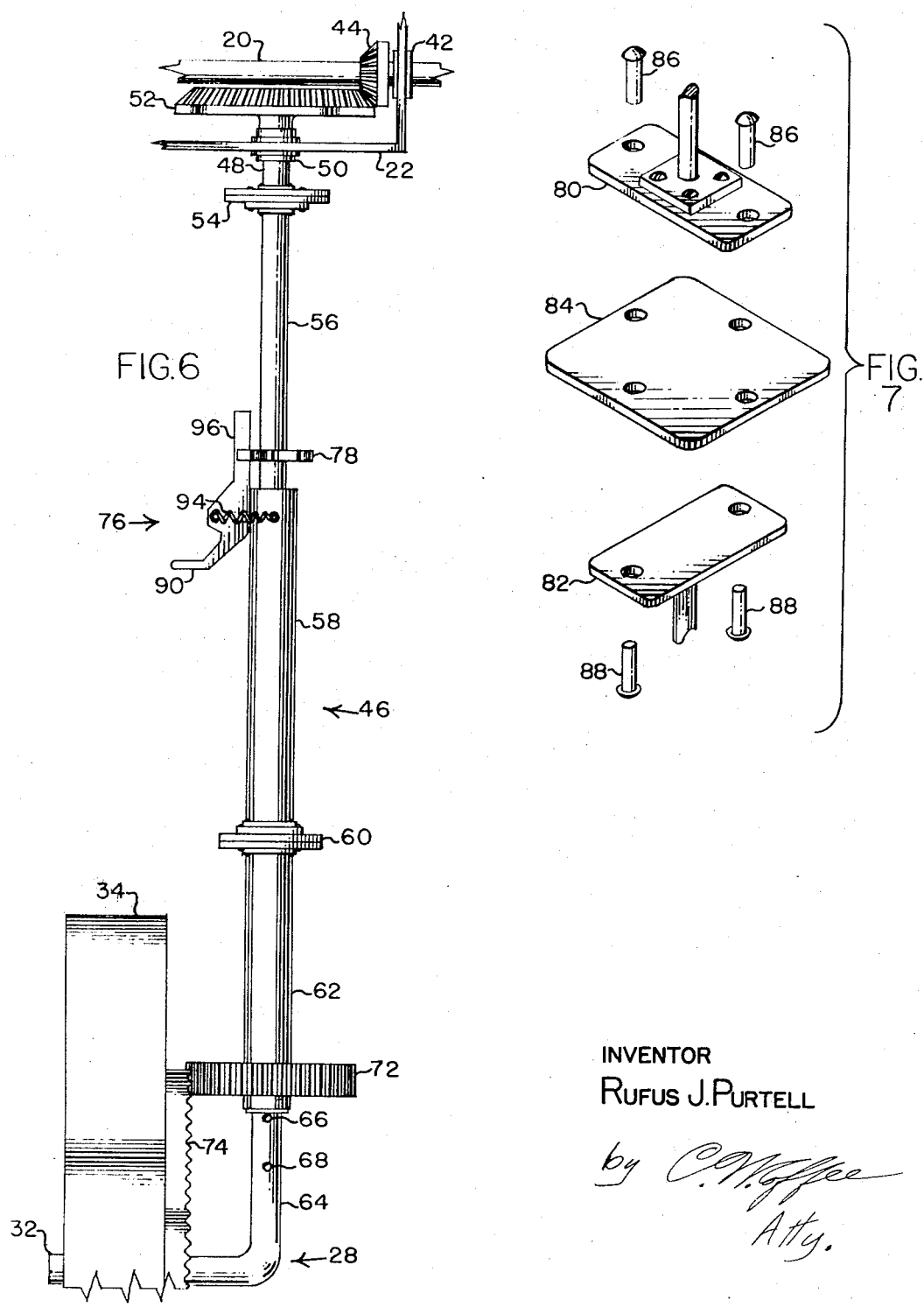

United States Patent Office 3,361,360
Patented Jan. 2, 1968

3,361,360
IRRIGATION SYSTEM
Rufus J. Purtell, Brownfield, Tex., assignor to The J. B. Knight Co., Inc., Brownfield, Tex., a corporation of Texas
Filed Dec. 7, 1965, Ser. No. 512,613
9 Claims. (Cl. 239—212)

ABSTRACT OF THE DISCLOSURE

Vehicles of an agricultural irrigation sprinkler system are driven at right angles to the pipe by shafts having "U-joints" and clutches whereby the vehicles may be guided or disconnected from power.

This application is a continuation-in-part of my prior applications identified as: Patent No. 3,245,595, April 12, 1966, Ser. No. 338,768, filed January 20, 1964; Patent No. 3,245,608, April 12, 1966, Ser. No. 264,507, filed March 12, 1963.

This invention relates to agricultural sprinkler systems and more particularly to means for moving an elevated sprinkler pipe from one location to another.

This application pertains to that particular type of sprinkler system for agricultural purposes wherein the sprinkler pipe is supported at all times elevated above the ground by a plurality of vehicles. The general sequence of operation is that the vehicles are stationary while the water is being supplied to the pipe. After one area of the field has been watered, the water flow is discontinued to the sprinkler pipe, the sprinkler pipe drained and disconnected from its source of water supply, all of the vehicles move the pipe transversely to a new position, the sprinkler pipe again connected to its source of water supply, and the water under pressure again supplied to the sprinkler pipe to water a new area (the dry area of the field adjacent to that which has just been watered).

It is often desirable to guide or steer the wheels of each vehicle at a slight angle to the general transverse movement to accommodate for sloping land or to accommodate for endwise movement for whatever cause. One additional cause of endwise movement might be furrows which are angled to the direction of movement.

An object of this invention is to provide an agricultural irrigation system which may be moved by its own power in a plurality of different directions.

Another object of this invention is to provide an agricultural irrigation system which may be towed endwise.

Further objects are to achieve the above with a device that is sturdy, compact, durable, simple, versatile, lightweight, and reliable, yet inexpensive and easy to manufacture and operate.

The specific nature of the invention, as well as other objects, uses and advantages thereof, will clearly appear from the following description and the accompanying drawing, the different views of which are not to the same scale in which:

FIG. 3 is a side elevational view of one vehicle of the system.

FIG. 4 is a detail of bracket construction, taken on line 4—4 of FIG. 3.

FIG. 5 is a bottom view with parts broken away for clarity.

FIG. 6 is an enlarged partial view showing the extensible shaft.

FIG. 7 is an exploded view of one of the flexible joints.

Figure 1:
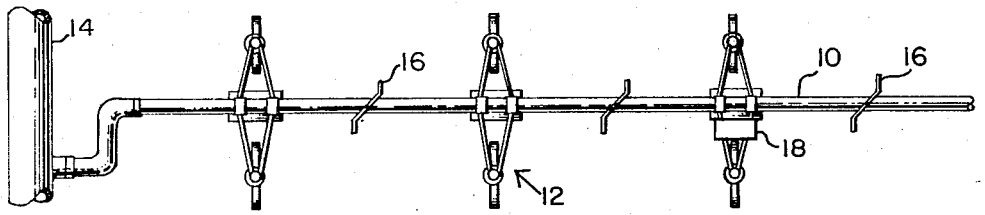
FIG. 1 is a plan view somewhat schematic in nature showing a portion of an irrigation system according to this invention.

Referring to FIG. 1, pipe 10 is supported by a plurality of vehicles 12. The pipe 10 is supplied with water under pressure from supply pipe 14. The pipe 10 has fluidly connected thereto a plurality of sprinklers 16 for sprinkling water upon the land to be irrigated. One of the vehicles 12 has mounted thereon power unit 18 (in the form of an internal combustion engine) which is drivingly connected to line shaft 20. Line shaft 20 extends along the pipe 10 and is journalled to each of the vehicles 12. Inasmuch as power units in the form of internal combustion engines are well known, the details of construction of such and the transmission from the power unit to the line shaft 20 have not been illustrated in detail.

Figure 2:
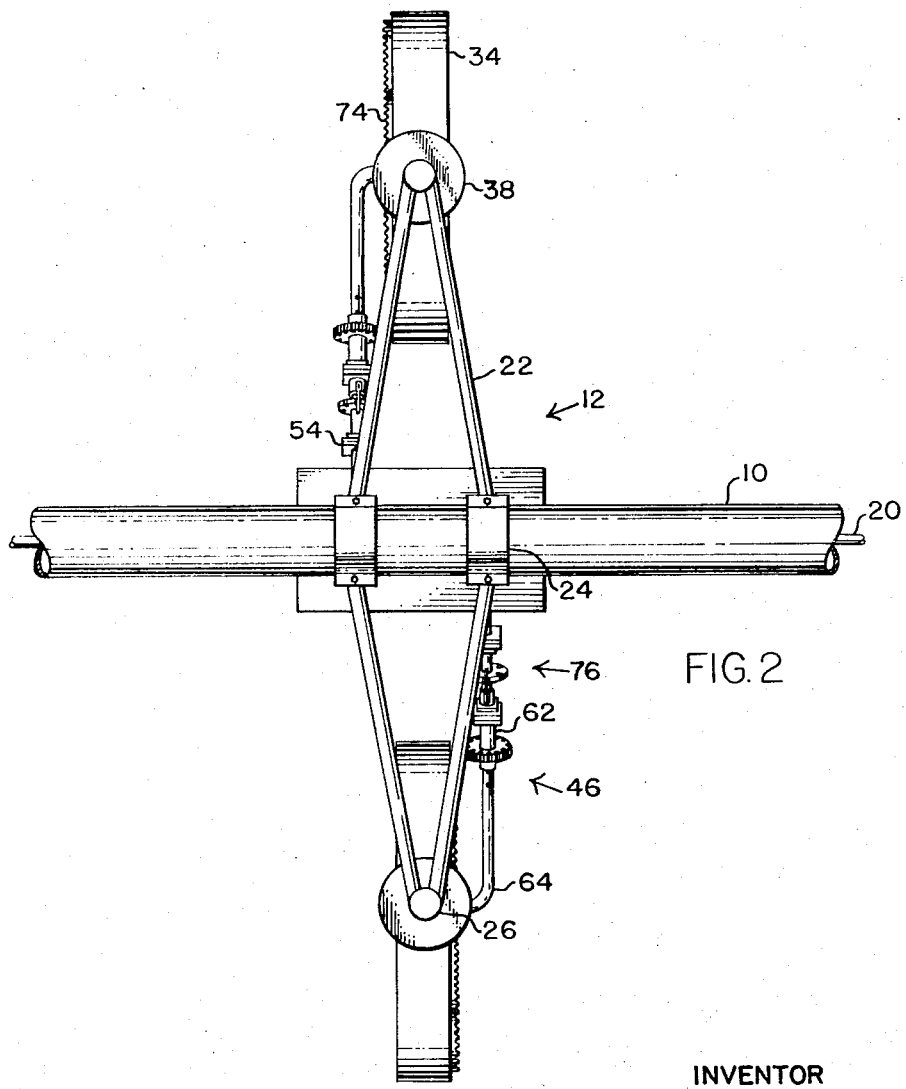
FIG. 2 is a plan view of one vehicle of the system.

Each of the vehicles includes frame 22. (FIGS. 2, 3 and 5.) The frame includes at least two clamps 24 which clamp the pipe 10 to the frame 22. The frame extends in front of and behind the pipe 10 and spaced from the pipe 10 are two vertical tubes 26 rigidly attached to the frame 22. Bracket 28 is journalled within each of the vertical tubes 26. Thus the bracket is mounted for rotation about a vertical axis. The bracket includes fork 30 which has horizontal axle 32 at its lower end, about which ground engaging wheel 34 is mounted. Circular plate 36 is attached to the top of the fork 30 co-axially with circular plate 38 which is attached co-axially to the bottom of tube 26. (FIG. 4.) Thus, by tightening and loosening set screw 40, the bracket 28 may be clamped in any of a plurality of adjusted positions.

The line shaft 20 is journalled to the frame 22 by line bearings 42. (FIGS. 5 and 6.) Adjacent each line bearing 42, line bevel gear 44 is attached to the line shaft 22. The line bearings 42 are located and depend from the frame 22 whereas the clamps 24 are located on top of the frame 22 and therefore the line shaft 20 is located immediately below the pipe 10.

Flexible, extensible, resilient shaft 46 drives each of the ground engaging wheels 34 from the line level gear 44. (FIGS. 3, 5 and 6.) This extensible, flexible shaft includes bevel stub shaft 48 which is journalled to the frame 22 by bearing 50. The bevel stub shaft 48 is at right angles to the line shaft 20 and carries thereon bevel gear 52 which is meshed with one of the line bevel gears 44. The line bevel gears 44 are set upon the line shaft 20 in opposite directions so that the bevel gears 52 are in opposite sides of the line bevel gears 44. Therefore, any thrust created by the operation of the gears is opposed and cancels out. The flexible, extensible, resilient shaft 46 extends substantially directly from the line shaft 20 towards the axle 32.

The bevel stub shaft 48 is attached to a flexible joint 54. (FIG. 6.) The other side of flexible joint 54 is connected to rod 56. The rod 56 is telescoped within tube 58 so that the shaft 46 is extensible by the rod 56 sliding within the tube 58. The tube 58 is connected to flexible point 60. The flexible joint 60 is attached to pinion tube 62 which is journalled upon L-shaped shaft 64. The short leg of the L-shaped shaft 64 forms the axle 32 which is attached to the bottom of the fork 30. Thus, the axis of the pinion tube 62 intersects the axle 32 at right angles. Pinion 72 is attached coaxially to the pinion tube 62.

The teeth of pinion 72 mesh (in the position illustrated) with the teeth of ring gear 74 which is secured to the spokes of the wheel 34.

Clutch 76 is attached to the rod 58 and operates to engage dogs 78 upon tube 56. Thus, when the clutch 76 is engaged, the wheel 34 is driven by the flexible, extensible, resilient shaft responsive to rotation of the line shaft 20.

The flexible joint 60, shown in greater detail in FIG. 7, is identical to flexible joint 54. The flexible joint includes strap 80 attached at right angles to the tube 58 and strap 82 attached at right angles to the pinion tube 62. Fabric 84 such as canvas with a vulcanized rubber covering is circular. Two diametrically opposed bolts 86 bolt the fabric to the strap 80. Two additional bolts 88 bolt the fabric to the strap 82. The bolts 86 and 88 are displaced 90° upon the fabric 84. The fabric 84 is flexible; therefore the joint 60 is flexible. Furthermore, the fabric 84 is resilient so that should one or the other of the wheels 34 encounter an obstacle, there is a certain resiliency in the drive which is desirable.

With the two flexible joints 54 and 60 and the extensible joint between the rod 56 and the tube 58, I have provided a flexible, extensible, resilient shaft 46 to drive the wheel 34 responsive to rotation of the line shaft 20.

The clutch 76 is desirable for alignment. If one of the vehicles 12 of the system becomes misaligned, the operator may disengage the clutches 76 of that vehicle and readily, manually move the vehicle into alignment and then re-engage the clutches. The clutch 76 (FIGS. 3 and 6) has lever 90 which is pivoted between two ears 92 which are welded to the rod 56. Helical springs 94 extend from the lever 90 to the rod 56, so that the lever is held by the springs in a snap positon in one of two positions; either with engaging arm 96 of the clutch 76 engaged with the dogs 78 or disengaged. The engaging arm 96 is elongated to accommodate sliding of the rod 56 within the tube 58.

In normal operation the wheels 34 will be adjusted by rotation of the brackets 28 and the setting of the set screw 40 to go in the desired direction generally transverse of the pipe 10. When the power unit 18 is activated, the line shaft 20 is rotated (in either direction) and the power is transmitted from the line shaft through the clutch 76 and the flexible, extensible, resilient shaft 46 to the pinion 72. The wheels 34 are rotated by the ring gear 74. The flexible shaft will accommodate adjustment to a slight degree to the right or left.

To move the system longitudinally or endwise (in a direction generally aligned with the axis of the pipe 10), the brackets 28 are rotated so that the wheels 34 are aligned to move the system longitudinally. When the bracket is rotated, the rod 56 is disconnected from its otherwise telescoped connection with the tube 58. Pin 66 in one of a plurality of holes 68 in L-shaped shaft 64 normally positions the pinion tube 62 so that the pinion 72 is engaged with the ring gear 74. However, when moving longitudinally, the pinion tube 62 is moved on L-shaped shaft 64 so that the pinion 72 is not meshed with the ring gear 74 and held in this position by pin 66 in another of the plurality of the holes 68. Then the system is adapted to be towed endwise by a towing vehicle (not shown).

It will be apparent that the embodiment shown is only exemplary and that various modifications can be made in construction, materials, and arrangement within the scope of the invention as defined in the appended claims.

I claim as my invention:

1. In an agricultural sprinkler irrigation pipe moving system having
    (a) a pipe adapted to carry water under pressure,
    (b) a plurality of sprinklers fluidly connected to the pipe for sprinkling water upon the land to be irrigated,
    (c) a plurality of vehicles movingly supporting the pipe,
    (d) a power unit on one vehicle driving
    (e) a line shaft extending along the pipe, and
    (f) journalled to each vehicle;
    the improvement in combination with the above comprising:
    (g) each vehicle having a frame,
    (h) each vehicle having two wheels,
    (j) each wheel mounted in a bracket journalled for rotation about a vertical axis to the frame,
    (k) a flexible, extensible shaft for each wheel,
    (m) extending from said line shaft to said wheel,
    (n) said flexible, extensible shaft driven from said line shaft,
    (o) said flexible, extensible shaft journalled to the frame adjacent said line shaft,
    (p) said flexible, extensible shaft journalled to the bracket adjacent said wheel, and
    (q) said flexible, extensible shaft drivingly connected to the wheel, whereby the power unit drives each wheel of the system in a guided position by the flexing extending shafts.

2. The invention as defined in claim 1 wherein
    (r) said flexible, extensible shaft is also resilient.

3. The invention as defined in claim 1 wherein
    (r) said driving connection from the line shaft to said flexible, extensible shaft is by bevel gears.

4. The invention as defined in claim 1 wherein
    (r) said flexible, extensible shaft has a clutch therein for interrupting the flow of power to each wheel.

5. The invention as defined in claim 1 wherein
    (r) the driving connection from said flexible, extensible shaft to said wheel includes a pinion gear on the flexible, extensible shaft and a ring gear on the wheel.

6. The invention as defined in claim 1 wherein
    (r) the bracket has means thereon for locking the bracket in one of many selected guided positions to the frame.

7. The invention as defined in claim 1 wherein
    (r) said flexible, extensible shaft is also resilient,
    (s) said driving connection from the line shaft to said flexible, extensible shaft is by bevel gears,
    (t) said flexible, extensible shaft has a clutch therein for interrupting the flow of power to each wheel,
    (u) the driving connection from said flexible, extensible shaft to said wheel includes a pinion gear on the flexible, extensible shaft and a ring gear on the wheel, and
    (v) the bracket has means thereon for locking the bracket in one of many selected guided positions to the frame.

8. In an agricultural sprinkler irrigation pipe moving system having,
    (a) a pipe adapted to carry water under pressure,
    (b) a plurality of sprinklers fluidly connected to the pipe for sprinkling water upon the land to be irrigated,
    (c) a plurality of vehicles movingly supporting the pipe,
    (d) a power unit on one vehicle driving
    (e) a line shaft extending along the pipe, and
    (f) journalled to each vehicle;
    the improvement in combination with the above comprising:
    (g) each vehicle having a frame,
    (h) two brackets, each pivoted to the frame about a vertical axis,
    (j) a ground engaging wheel journalled in each bracket,
    (k) a gear ring attached to the side of each wheel,
    (m) a pinion whose teeth are meshed with the teeth of the gear ring,
    (n) said pinion on a pinion shaft whose axis is at right angles to the axis of the wheel, and
    (o) means interconnecting said pinion shaft and line shaft for rotating the pinion shaft responsive to rotation of said line shaft,
(p) the means for rotating the pinion shaft includes a flexible, extensible, resilient shaft.
9. The invention as defined in claim 8 wherein
(p) the means for rotating the pinion shaft includes a clutch for interrupting the flow of power to each wheel,
(q) said pinion shaft is journalled to said bracket.

References Cited

UNITED STATES PATENTS 3,245,595   4/1966   Purtell _____ 239—212
3,245,608   4/1966   Purtell _____ 239—212

M. HENSON WOOD, Jr., *Primary Examiner.*

MICHAEL MAR, *Assistant Examiner.*